United States Patent [19]

Karterman

[11] Patent Number: 5,314,617
[45] Date of Patent: May 24, 1994

[54] ACCUMULATOR FOR OIL SLICK SKIMMER

[76] Inventor: Don S. Karterman, 675 Birch St., Anchorage, Ak. 99501

[21] Appl. No.: 994,306

[22] Filed: Dec. 21, 1992

Related U.S. Application Data

[62] Division of Ser. No. 846,840, Mar. 6, 1992, Pat. No. 5,215,634.

[51] Int. Cl.⁵ .......................................... E02B 15/04
[52] U.S. Cl. .................................. 210/242.3; 210/521; 210/923
[58] Field of Search ...................... 210/122, 242.3, 923, 210/519, 521, 538, 540

[56] References Cited

U.S. PATENT DOCUMENTS

| | | | |
|---|---|---|---|
| 3,615,017 | 10/1971 | Valdespino | 210/923 |
| 3,656,624 | 4/1972 | Walton | 210/242.3 |
| 3,688,909 | 9/1972 | Titus et al. | 210/242.3 |
| 3,704,784 | 12/1972 | Craggs et al. | 210/242.3 |
| 3,748,264 | 7/1973 | McCombie | 210/242.3 |
| 3,754,653 | 8/1973 | Verdin | 210/197 |
| 3,762,169 | 10/1973 | Graham | 210/923 |
| 3,815,751 | 6/1974 | Pavlovic | 210/242.3 |
| 3,830,370 | 8/1974 | Glaeser et al. | 210/923 |
| 3,860,519 | 1/1975 | Weatherford | 210/923 |
| 3,885,062 | 4/1975 | Rafael | 210/242.3 |
| 3,923,661 | 12/1975 | Crisafulli | 210/242.3 |
| 3,951,810 | 4/1976 | Crisafulli | 210/242.3 |
| 3,966,613 | 6/1976 | Kirk et al. | 210/242.3 |
| 3,980,559 | 9/1976 | Netzell | 210/776 |
| 3,998,060 | 12/1976 | Preus | 210/923 |
| 4,006,082 | 2/1977 | Irons | 210/776 |
| 4,116,833 | 9/1978 | Stagemeyer et al. | 210/776 |
| 4,119,541 | 10/1978 | Makaya | 210/242.3 |
| 4,128,068 | 12/1978 | Ogura et al. | 114/26 |
| 4,237,012 | 12/1980 | Torre | 210/923 |
| 4,249,834 | 2/1981 | Bouvier | 405/70 |
| 4,388,188 | 6/1983 | Morris | 210/242.3 |
| 4,595,510 | 6/1986 | Winbladh et al. | 210/242.3 |
| 4,851,133 | 7/1989 | Rymal | 210/776 |
| 4,959,143 | 9/1990 | Koster | 210/242.3 |
| 4,963,272 | 10/1990 | Garrett | 210/776 |
| 4,988,438 | 1/1991 | Eddleman | 210/242.3 |
| 5,002,430 | 3/1991 | Smith | 405/66 |
| 5,019,277 | 5/1991 | Andelin | 210/923 |
| 5,030,363 | 7/1991 | Pole | 210/776 |
| 5,073,261 | 12/1991 | Conradi et al. | 210/521 |
| 5,139,363 | 8/1992 | Jenkins | 210/923 |

*Primary Examiner*—Christopher Upton
*Attorney, Agent, or Firm*—Warren F. B. Lindsley

[57] ABSTRACT

An accumulator for oil, water and/or sea life comprising an elongated hull having an inlet at one end thereof and an outlet at the other end thereof with the inlet comprising a sluice gate. A cover comprising a float means is used for controlling the vertical position and buoyancy of the accumulator relative to an associated craft.

3 Claims, 6 Drawing Sheets

ACCUMULATOR FOR OIL SLICK SKIMMER

BACKGROUND OF THE INVENTION

This application is a division of U.S. patent application Ser. No. 07/846,840 filed Mar. 6, 1992 entitled "Oil Slick Skimmer", now U.S. Pat. No. 5,215,634.

This invention relates to the removal of oil slicks and other pollutants from water surfaces and particularly those oil slicks accidentally caused while handling, transporting, processing or controlling massive quantities of oil.

For many years, oil spillages at sea have been a problem recognized by the International Maritime Committee and other concerned bodies to the extent that as early as 1970 two conventions were held directed to the subject of liability and legal responsibility for such spills. The damage and clean-up costs of large spills can reach millions and even billions of dollars which, along with the damaging publicity, present a very serious problem for the industries involved.

Major spillages, such as that which occurred when the tanker Torrey Canyon went aground in the English Channel in 1967, leaking 117,000 tons of crude oil into the sea, and the Santa Barbara 1969 offshore oil platform spillage of about 1000, tons over a three month period and now the Exxon Valdez spill in the Prince William Sound, the worst spill of all, are occurring at a seemingly increasing rate. As more and more oil is transported by larger and larger tankers, and with more offshore drilling finds, the problem is apt to become more pronounced.

Since oil spills are likely to continue, with their resulting effect on marine life and biology at sea and on shore, a method and apparatus is needed for removing the oil slick as rapidly as possible from the water to control its spreading.

In the past, oil spills usually occurred in small quantities at sea or in a harbor and complaints, if any, were local; but today the awareness of pollution hazards bolstered by the massive spills of modern offshore derrick and giant tankers has become highly vocal. In addition to being a fire hazard, oil slicks blown or driven by waves to shore ruin beaches and destroy biological life for years to come.

Oil slicks floating at sea vary considerably in thickness depending on the quality of crude oil spilled, the wind, size of the oil patch and conditions of the sea. While the oil slick thickness is usually measured in thousandths of an inch, it can build up to as such as 0.2 inches or more. Thin films, however, are most general.

Accordingly, oil spills must be removed from the water as quickly as possible to prevent damage at sea and on the shore. However, to date, no efficient or effective method and apparatus have been conceived to handle large oil spills while at the same time protecting the natural state of the sea and land from long-term pollution and harm.

FIELD OF THE INVENTION

Detergents and other chemical treatments of the oil slicks have been used, but each has its own limitations and hazards which can be as undesirable as the oil slick itself. Since oil spillage can occur any place on the water over which the oil is being transported, it is necessary to provide new and improved portable apparatus for implementing the clean-up process.

This invention is particularly directed to a safe, effective and expeditious method and apparatus for the removal of oil slicks at sea, in a lake or on a river with portable apparatus which is easily movable to the scene of the spill.

DESCRIPTION OF THE PRIOR ART

In the disaster, where the tanker Torrey Canyon ran aground and leaked tons of crude oil into the English Channel, the British utilized non-ionic detergents, trying with some success to emulsify the oil, breaking it up into small particles which with evaporation greatly reduced the masses of oil reaching shore.

At sea, the French used powdered chalk spread on the slick of the Torrey Canyon and churned it up with small but powerful boats. This caused the oil to break up and sink into the sea. They also tried this same technique along with sawdust with some success. Both methods still did not remove all of the oil from the water and a large amount of it still floated ashore. One French ship tried to "pile up the slick" against the side of the ship and then tried to, in effect, vacuum it with the broad nozzle of a hose. This worked, but the amount of oil recovered was relatively small.

Straw, hay, sawdust, detergents and other cleansers have been spread on the water along the shore and used on the waters along the shore and on the rocks to soak up the oily mess caused by the oil slick. While this effort produced some results, the oil scars remained for years.

These occurrences pushed the limits of the art under extremely extenuating circumstances. The efforts were very costly, abrasive socially and politically, and harmful to the natural state that existed previously. The dollar cost was staggering.

The need for better ways to remove oil slicks at sea is vital and should be solved quickly and as near to the oil spill source as possible.

The following patents disclose various apparatus for collecting waste from the surface of a body of water.

| | |
|---|---|
| 3,656,624 | 4,006,082 |
| 3,688,909 | 4,116,833 |
| 3,704,784 | 4,119,541 |
| 3,748,264 | 4,128,068 |
| 3,754,653 | 4,249,834 |
| 3,815,751 | 4,388,188 |
| 3,860,519 | 4,851,133 |
| 3,923,661 | 4,963,272 |
| 3,951,810 | 4,988,438 |
| 3,966,613 | 5,002,430 |
| 3,980,559 | 5,030,363 |

These patents disclose apparatus for not only collecting the contents of an oil slick in an accumulator but also disclose various types of skimmers, scoops and free floating weir configurations.

U.S. Pat. No. 3,815,751 is directed to apparatus for separating fluids of different densities and employs a separating tank having first and second sections.

Some of these patents disclose catamarans with pivotal fore and aft gates for collecting oil slicks. Others disclose elaborate separating means for the contents of an oil slick.

U.S. Pat. Nos. 4,006,082 and 4,116,833 disclose floating and flexible booms for collecting pollutants.

U.S. Pat. No. 4,249,834 discloses an oil spill containment device employing a flotation collar structure surrounding the periphery of the vessel to be contained.

All of the other patents listed above disclose various modifications of apparatus for separating the oil from the water and collecting the oil in various forms of accumulators that are replaceably mounted on different types of vessels. None are believed to show the claimed apparatus set forth herein.

SUMMARY OF THE INVENTION

In accordance with the invention claimed, a new and improved, easily maneuverable boat, barge, raft or craft is provided employing an appended skimmer which skims and gathers from the surface of the water the oil of an oil slick along with a minimal amount of supporting surface water into a compartmental shell, bladder or accumulator which is detachably movable relative to the main deck of a craft. This surface oil is then separated from the water and drained or pumped into the accumulator and from there it may be pumped into an associated hull of a ship, tanker or shore facility. The water in the bladder, accumulator or shell of the barge, when separated from the oil, is usually pumped through a water filter before returning to the sea. In this disclosure, the craft functions effectively when floating in an oil slick and, inter alia, by the effects of gravity draws the oil slick into an accumulator in its hull. The oil slick may be drawn into an accumulator by one or more tugs pulling a boom, which boom forces the oil slick into the skimmer associated with the accumulator of the craft as hereinafter described.

In essence a self powered boat is provided for skimming the oil slick off of the water which employs a bow mounted weir and boom guide. An accumulator for receiving the skimmed water oil mixture is stern mounted and is readily replaced by another accumulator when full.

It is, therefore, one object of this invention to provide a new method for gathering and removing oil slicks and minimal supporting water from an oil spill at sea or elsewhere.

Another object of this invention is to provide an improved apparatus for skimming an oil slick and a minimum amount of its associated supporting surface water off of a body of water.

A further object of this invention is to provide an improved apparatus for skimming oil slicks from a body of water which is adjustable to control the amount of associated supporting water handled by the apparatus.

A still further object of this invention is to provide an apparatus for continuously separating oil from an oil slick with the oil retained and the water returned to the sea.

A still further object of this invention is to provide a self-contained barge, boat or craft that is portable for rapid highway or air transportation directly to the scene of an oil spill.

A still further object of this invention is to provide a self-contained independently movable oil skimming and containing device.

A still further object of this invention is to provide an oil collecting and containing apparatus that serves as a repository for retrieved oil.

A still further object of this invention is to provide an apparatus for skimming and collecting oil from an oil slick wherein an accumulator is used which is independent and detachable from the skimming vessel employing it.

Yet another object of this invention is to provide a skimming vessel formed from a number of parts which may be packaged in a nesting manner for portability.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which.

DESCRIPTION OF THE PREFERRED EMBODIMENT

Figures 1, 7, 9:
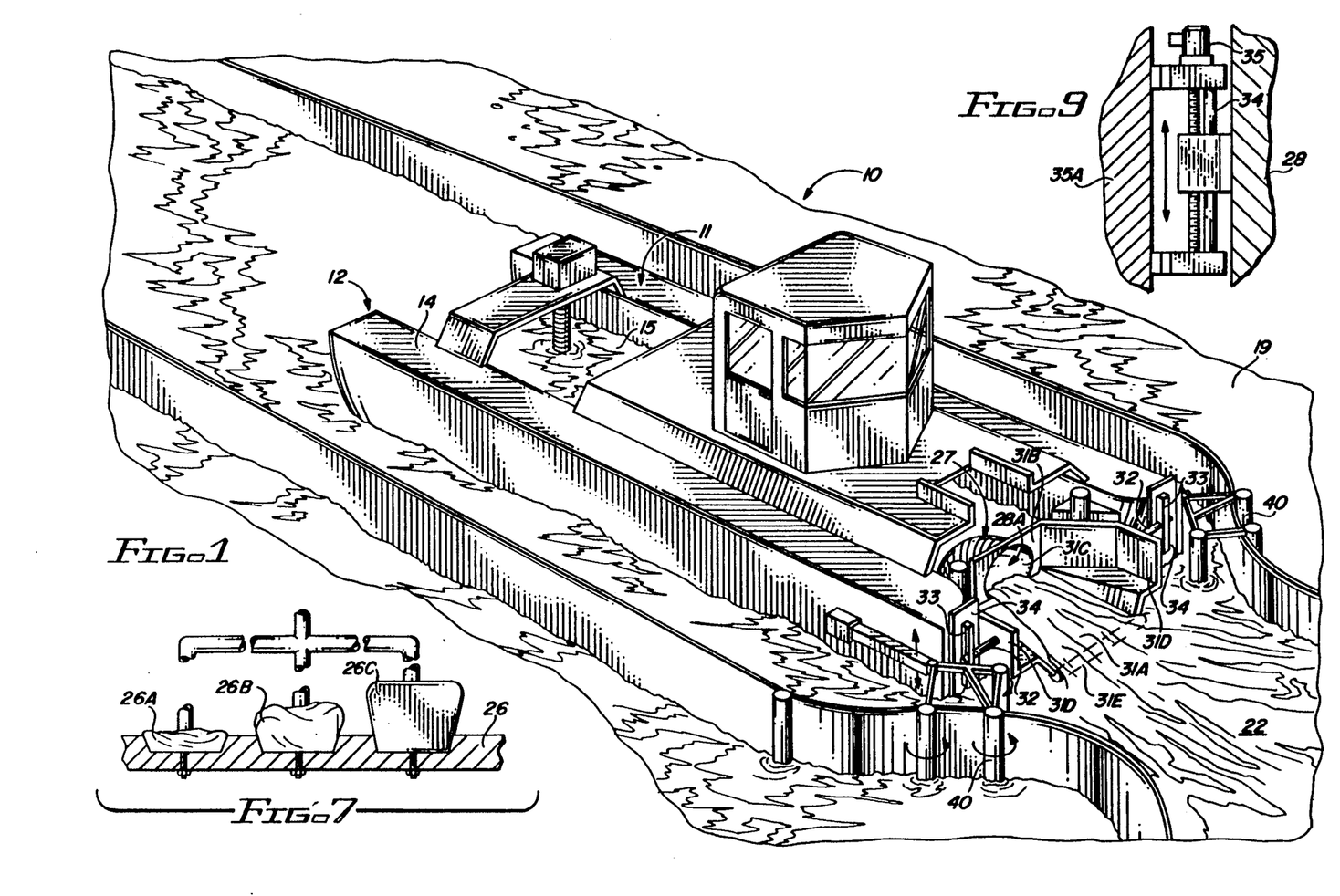
FIG. 1 is a perspective view of a sea skimmer oil containment system and embodying the invention.
FIG. 7 is a cross sectional view of FIG. 3 taken along the line 7—7.
FIG. 9 is a partial view of a motor actuated jack screw for raising and lowering the weir and weir floats shown in FIG. 1.
Figure 2:
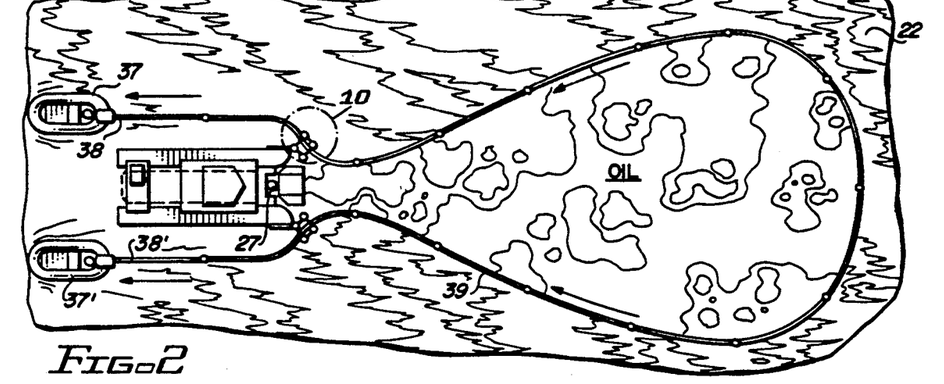
FIG. 2 is a plan view of an oil slick with a boom around part of it and a pair of tugs each pulling a different end of the boom to the sea skimmer shown in FIG. 1.

Referring more particularly to the drawings by characters of reference, FIGS. 1 and 2 disclose a floating barge or craft 10 towed or self propelled in the usual manner comprising a pair of weighted floats 11 and 12 which are parallel and spacedly arranged to form a hull the superstructure of which defines a walkway 14 forming a deck or lid bolted to the top of floats 11 and 12 and extends at least partially around a hollow opening 15 in the center of the craft with opening 15' providing a view of the submerged accumulator and connection of the associated pump, air and pipe lines.

As shown in FIGS. 1, 3, 4 and 5 each float comprises a hull 16 having a plurality of vertically extending bulkheads 17 arranged internally thereof along its length and a buoyancy cell 18 at its base. Buoyancy cell 18 comprises a hollow cylinder which is partially or totally filled with sea water 19 and contains one or more inflatable bladders, 20A, 20B and 20C. These bladders are partially or totally filled with air through suitable air inlet-outlet means 20D to offset the amount of sea water in buoyancy cell 18 for stabilizing the craft in any given sea.

The opening 15 in craft 10 is provided for receiving a hollow accumulator or shell 21 in a detachable manner with the accumulator receiving the contents of an oil slick 22. The accumulator enters craft 10 from its stern into a V-shaped saddle or cradle 23 the flanges of which formed along its two sides are clamped between walkway 14 and the top of floats 11 and 12. This cradle creates a strong unit and forms a platform for the accumulator to rest on. Once the accumulator is in the cradle, crew members can visually view it for aid in connecting to it hydraulic rams, pumps and the required air lines as hereinafter described.

It should be noted that the accumulator may be biased or floated above its saddle for servicing and then settled down into and interlocked with its saddle when fully serviced.

Initially, the accumulator is filled with water before entering via the stern of craft 10 to rid it of its buoyancy. An empty shell would bounce on the waves with respect to the vessel or craft which is virtually nonbuoyant. An empty shell if moved into the craft would pound the bottom of the deck thereby destabilizing the vessel if the shell was locked into place empty.

Figures 3, 4, 5:
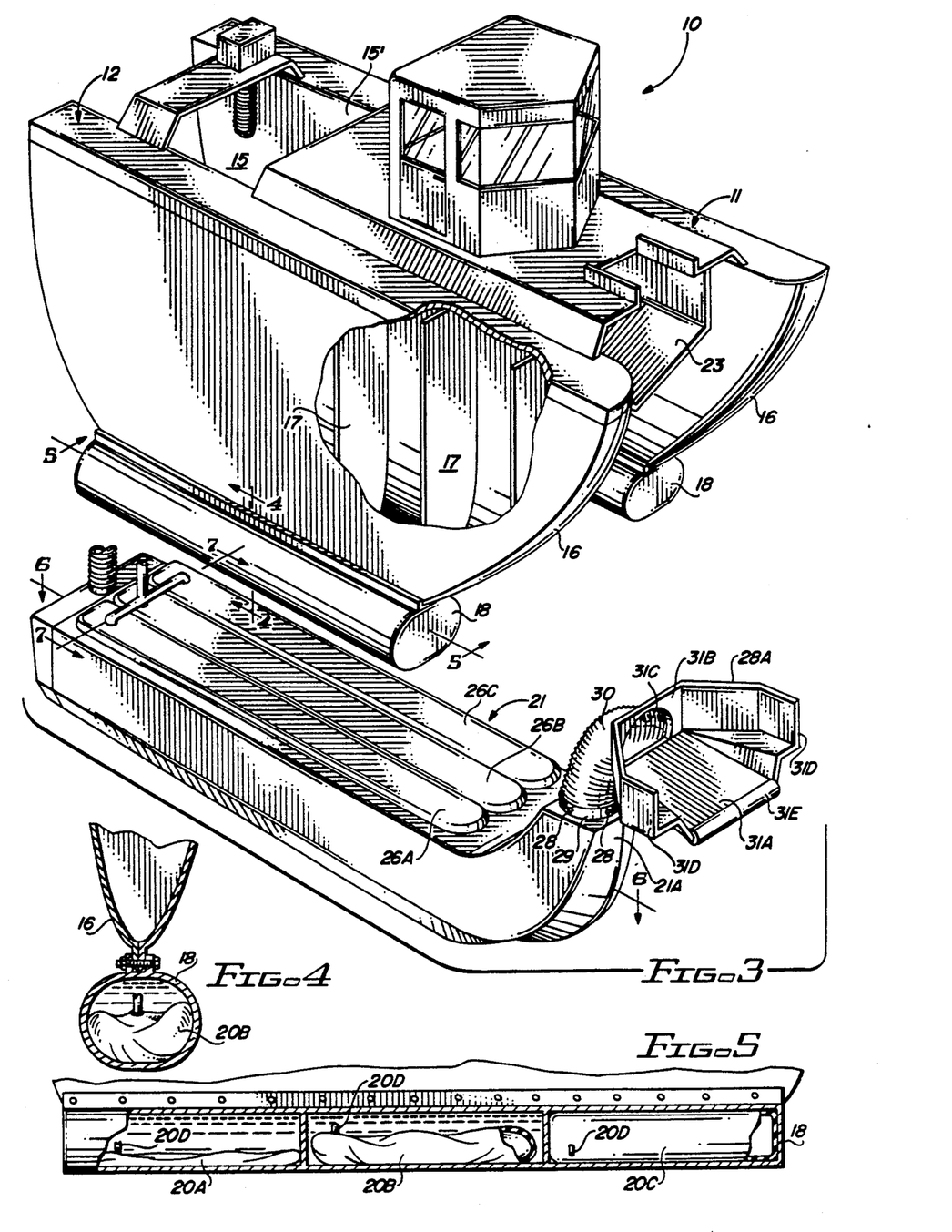
FIG. 3 is a partial perspective exploded view of FIG. 1.
FIG. 4 is a cross sectional view of FIG. 3 taken along the line 4—4.
FIG. 5 is a cross sectional view of FIG. 3 taken along the line 5—5.
Figure 3A:
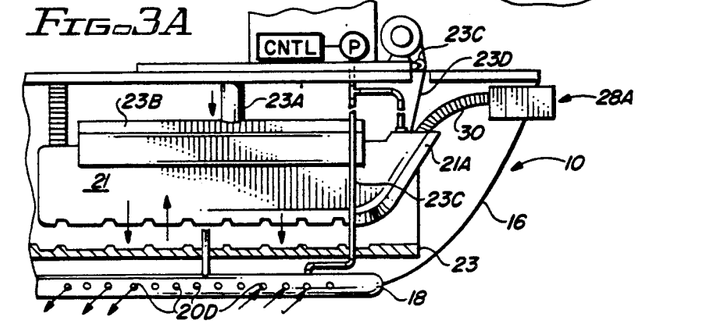
FIG. 3A illustrates a cross sectional view of FIG. 1 illustrating the pneumatic control of the accumulator, floats of the craft and the weir.

FIG. 3A illustrates diagramatically a hydraulic cylinder 23A and clamp 23B for engaging accumulator 21 for controlled movement of accumulator 21 relative to hulls 16 of craft 10 and the related winch mounted air lines 23C and winch mounted cable 23D. Both air lines and winch cable may comprise a common line controllable by an operator in the pilot house.

Figures 3B, 17:
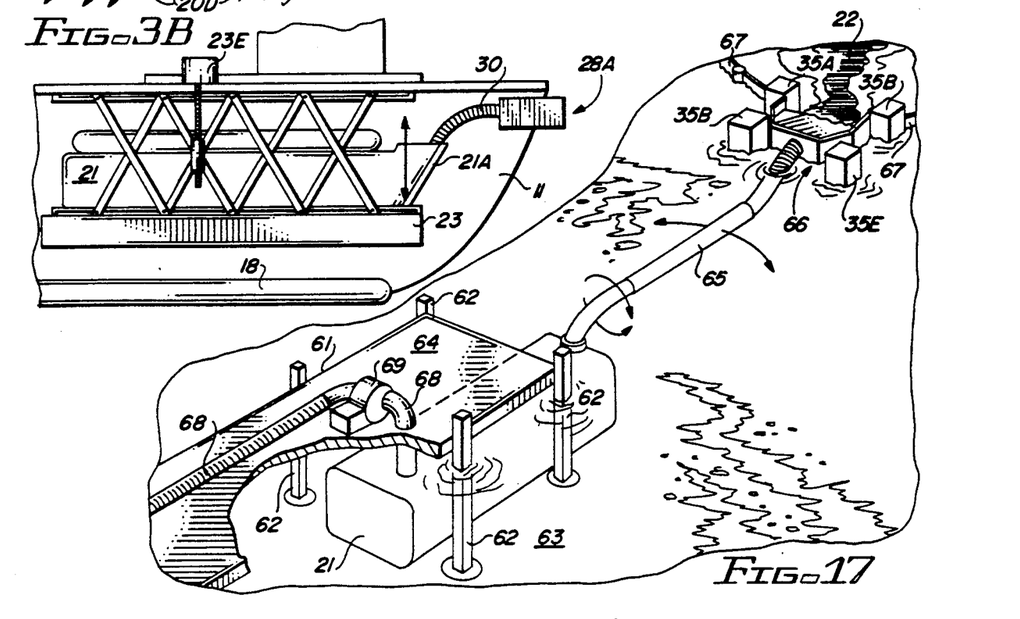
FIG. 3B illustrates a scissor mounting with an accumulator within the spaced hulls of the sea skimmer shown in FIG. 1.
FIG. 17 is a perspective view of a scaffold for supporting a deck above an ocean bottom supported accumulator for use in shallow water.

As shown in FIG. 3B, the accumulator may be scissor mounted between floats and controlled by a threaded motor operated means 23E for movement relative to the floats.

Figure 6:
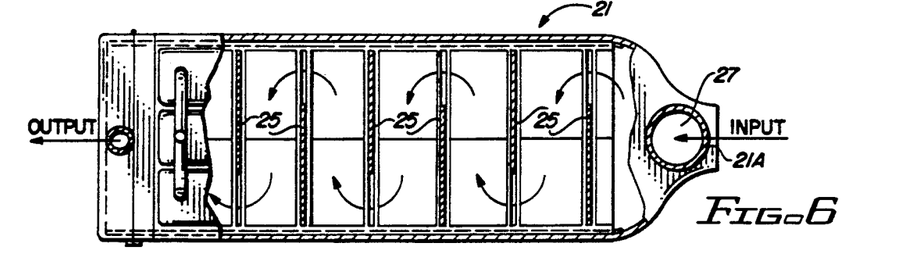
FIG. 6 is a cross sectional view of FIG. 3 taken along the line 6—6.
Figure 8:
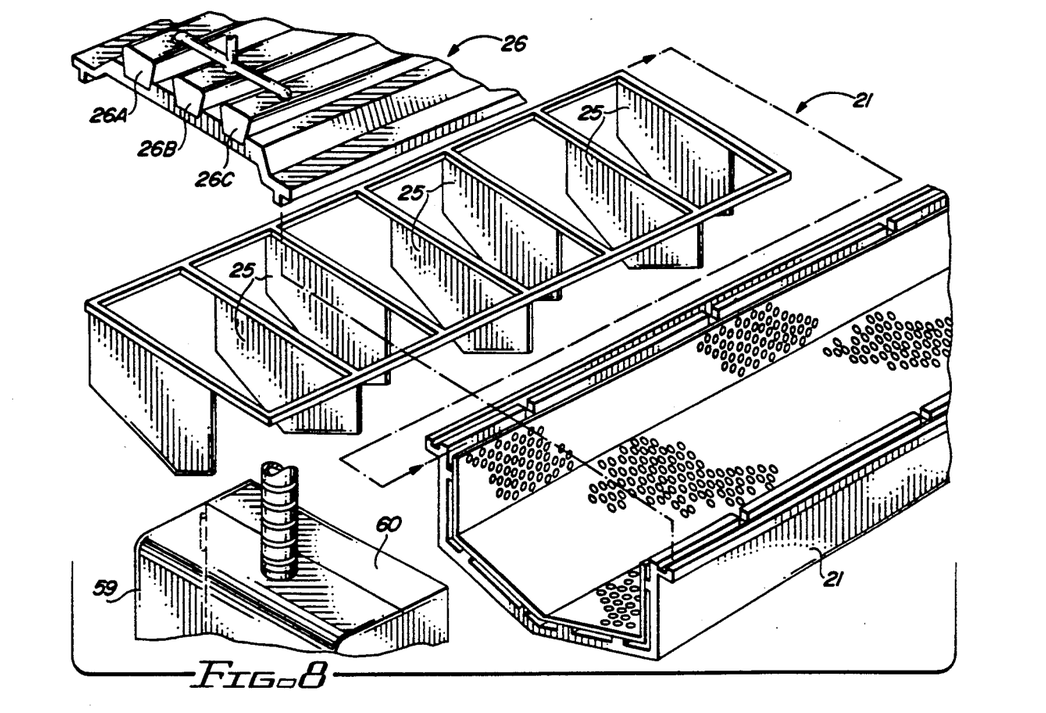
FIG. 8 is an exploded view of the accumulator shown in FIG. 1.

As shown in FIGS. 6 and 8, accumulator 21 employs a plurality of spaced baffles 25 for controlling the movement of the liquid content therewithin. The accumulator comprises a cover 26 which fits over and seals the accumulator. This cover comprises three floatation shells 26A, 26B and 26C as shown in FIG. 7 which are simultaneously filled or expelled of sea water to control the buoyancy of accumulator 21 in the water in craft 10.

The top of the accumulator is provided with a suitable sluice gate 27 such as, for example, a rectangular or circular opening for receiving the oil slick in a controlled manner. This opening may be fitted with a suitable ball shaped connector or gimbal formed to fit around the opening.

One method of filling the accumulator in a controlled manner is to lower it in the water to a position where the opening of sluice gate 27 is just below the line of demarkation of the oil and water since the oil will move much more easily into the accumulator if it rides on a surface of water. In positioning the accumulator, it should be noted that the sluice gate should be the highest point of the accumulator in the cradle. As shown in FIG. 3, the sluice gate 27 may be provided with four sensors 28 equally spaced around its periphery for sensing air and water content in the accumulator and controlling the accumulator's angular position relative to the craft. The neck 21A of the accumulator is elevated above the level of the remainder of the accumulator so that any air remaining in the accumulator will move into its neck 21A for better control thereof.

There are a number of ways of controlling the opening of the sluice gate one of which is to provide a weir or scoop 28A to fit around its opening which may be adjustably mounted such that it may selectively receive the oil slick flow horizontally thereinto and laterally into the accumulator.

In order to connect scoop 28A to bladder or accumulator 21, a collar 29 may be formed around the opening into the accumulator. A suitable swivel having a gimbal action may be mounted around this collar to permit movement of scoop 28A and its associated hose 30 vertically independent of the accumulator.

The adjustable weir or scoop 28A may comprise a base 31A hingedly attached to a substantially vertically positioned plate 31B that is provided with an opening 31C for receiving oil slick 22. Plate 31B is provided with arms 31D at each side thereof to form together with plate 31B a U-shaped scoop for receiving the oil slick. As noted the front or lip of base 31A is provided with an inflatable tube 31E for aiding in maintaining the base in a substantially horizontal floating position.

As noted from FIG. 1, scoop 28A is vertically adjustable by means of rods 32 which extend laterally from each side thereof for positioning opening 31C of the scoop in a proper position for skimming off the oil with the least amount of water. The ends of rods 32 are movable in vertically positioned slots 33 in bow plates or weir floats 34.

Figure 1A:
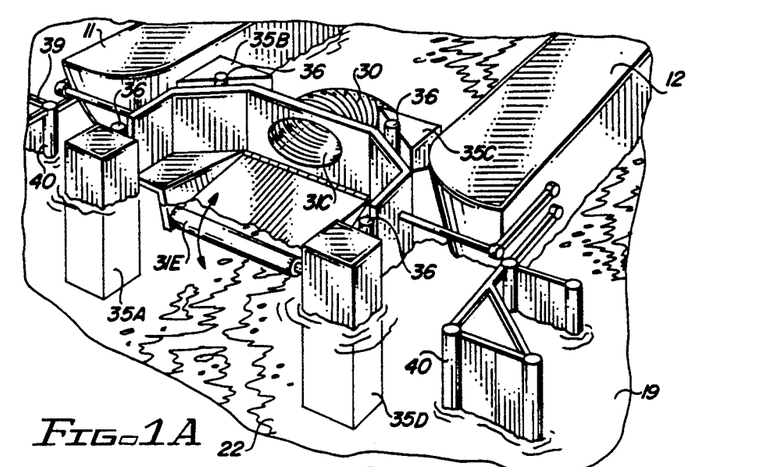
FIG. 1A illustrates a modification of the weir or scoop mounting shown in FIG. 1.

FIG. 1A illustrates another way of mounting weir or scoop 28A wherein a plurality of weir floats 35A-35D are used. Each float is attached to a motor operated jack screw 36 for movement thereof.

Thus, the operator of craft 10 controls the position of the sluice gate 27 relative to the surface of the oil slick. When the sluice gate is positioned at a desired depth below the surface of the water, the oil slick will flow by the action of gravity into accumulator 21.

The flow of the oil slick and the minimal supporting water is skimmed off continuously into the accumulator. When it is full of liquid, the oil from the oil slick will rise to the top of the liquid in the accumulator and it will then be feasible and desirable to pump accumulated sea water out of the bottom of the accumulator through one or more exit drain pumps. Thus, as sea water is pumped out of the accumulator, filtered and pumped back into the sea, lake or river, it is replaced by gravity with further oil slick liquid. Eventually, the accumulator is filled with oil at which time the accumulator must be replaced or the oil therein pumped out into a shore, tow barge or tanker hull storage facility.

The pumps may be of any suitable size which can handle up to 36 gallons per second or more at 2000 RPM. The Jacuzzi Marine Jet Propulsion pumps series 12WI can handle this function. Any other pumping arrangement to accomplish the handling of a large quantity of water may be used, such as electric or their equivalent used singly or in multiple combination, depending on the volume of oil and water handled and the size of the craft and associated accumulators.

An associated tow barge or tanker hull is necessary to provide enough storage capacity to handle the continuous flow required for efficient oil slick removal.

Air automatically will seek the highest point in the accumulator neck 21A. It is necessary to have an air column in the accumulator so a fluid level can be established. The reason for using a neck for this air/fluid column is that very little air is required. If the whole accumulator were used too much air would be present because of the size of the needed air/fluid column.

By using a neck on the accumulator one can achieve an air/fluid column with little air space and secondly air is trapped in one location otherwise it, the air column bubble, would shift back and forth in the shell causing instability. Thirdly, this design keeps the air/fluid column where the sensors are.

The sensors regulate the air/fluid level in the neck by increasing or decreasing the amount of water being pumped from the bottom of the shell in direct relation to water/oil entering the shell. Four level sensors give an accurate fluid level reading when shell is level or not etc.

As shown in FIG. 2, a portion of oil slick 22 may be dragged into scoop 28A leading into opening or sluice gate 27 of accumulator 21 by a pair of tugs 37, 37'. These tugs pull ends 38, 38' of a boom 39 causing the enclosed oil of the oil slick 22 to be dragged toward scoop 28A and opening 27 of accumulator 21 forcing it thereinto as heretofore explained. The boom is intended to float on the water but penetrating the oil well below the line of demarkation of the oil and water of the oil slick.

Figures 10, 11, 14:
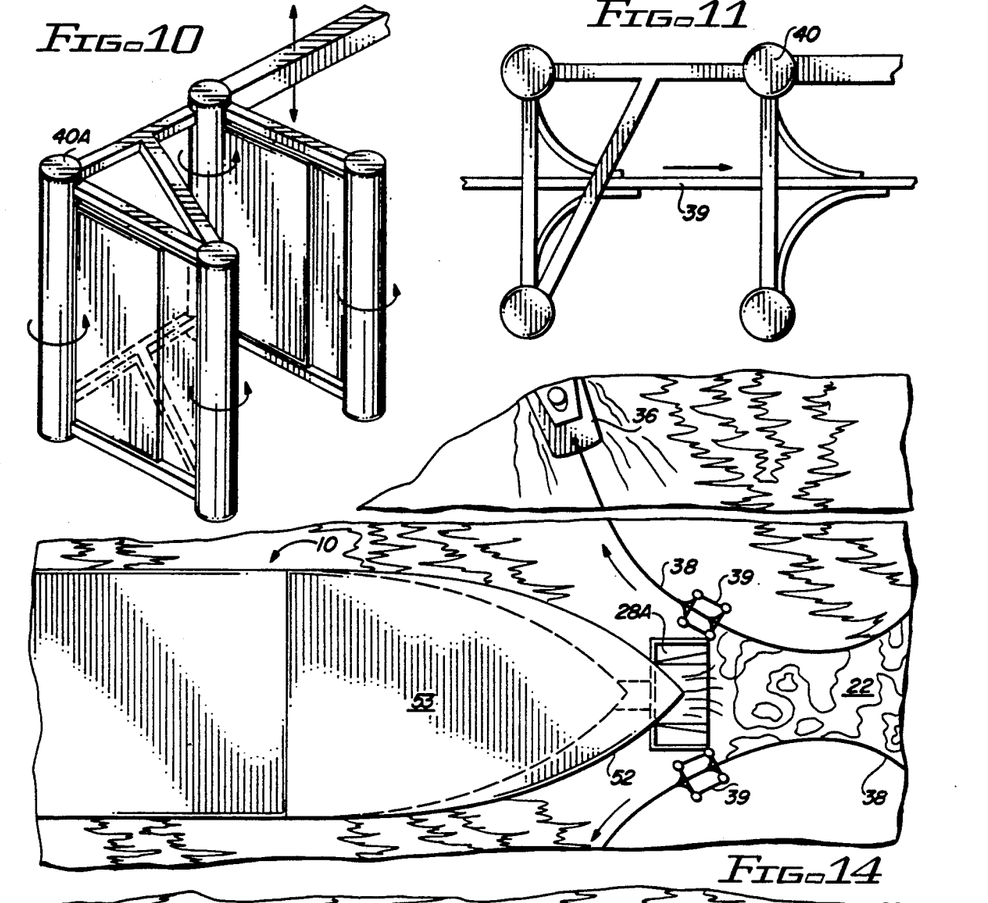
FIG. 10 is a perspective view of the boom guides shown in FIGS. 1 and 2.
FIG. 11 is a top view of FIG. 10 with the boom in place in the boom guides.
FIG. 14 is a plan view of a tanker fitted with a removable scoop and weir.

As noted from FIGS. 1A, 10 and 11, boom 39 is pulled through suitable boom guides 40 mounted on the corners of the bow of craft 10 which act as a squeegee and it may be pulled back out and away from craft 10 by a tug. The boom guides 40 comprising floating rollers 40A have vertical movement independently of craft 10.

Figure 12:
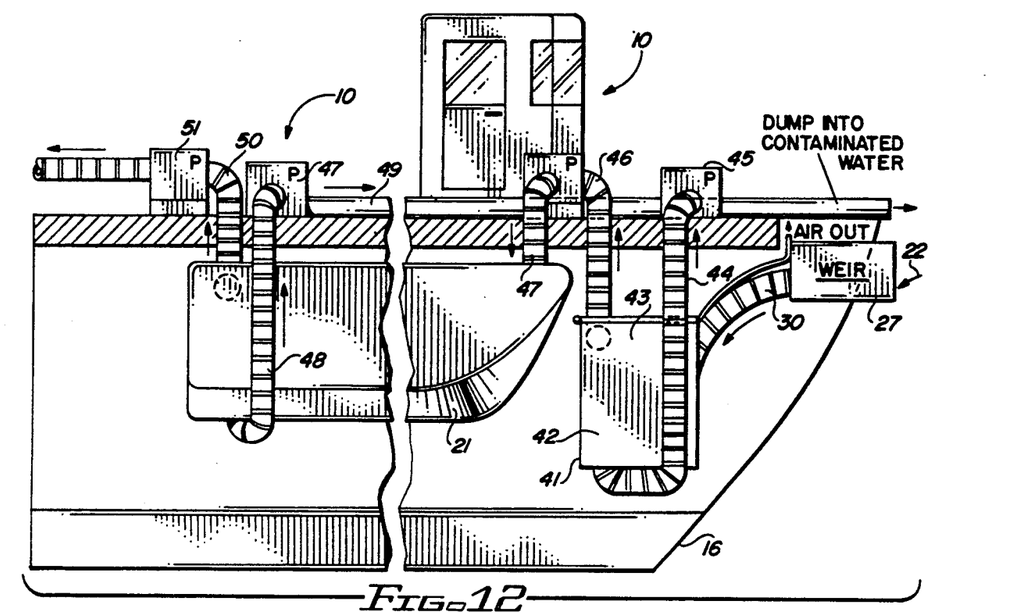
FIG. 12 is a schematic view of FIG. 1 showing the path of movement of the sea water and oil into and out of the accumulator.
Figure 13:
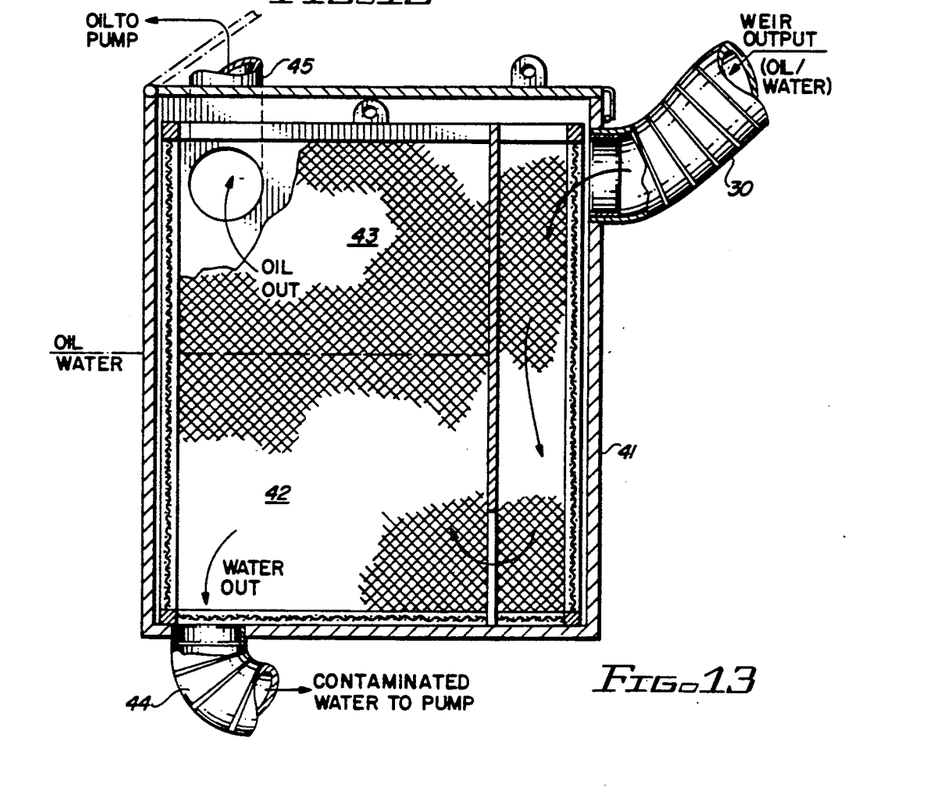
FIG. 13 is a cross sectional view of the filter shown in FIG. 12.

FIGS. 12 and 13 illustrate the air, oil and sea water flow into and out of accumulator 21. As shown, a part of oil slick 22 flows into scoop 27 of the weir and through hose 30 into a separator 41. The separator comprises a vertically positioned cylindrical device which screens the incoming oil slick and causes the water thereof to flow to its lower portion 42 with the oil rising to its upper portion 43.

The separated sea water in the lower portion 42 is pumped back to the sea through a suitable pipe 44 and pump means 45 with the oil from the upper portion 43 being pumped by a pipe and pump means 46 through pipe 47 to accumulator 21.

Sea water from the bottom of accumulator 21 is pumped by pump 47 through pipes 48 and 49 back to the sea. Oil from the top of accumulator 21 is pumped through pipe 50 and pump 51 to a suitable storage device such as a tanker standing thereby or to a shore facility. FIGS. 12 and 13 may comprise a double separator with the first stage separating removable debris.

It should be noted, as shown in FIG. 14, that scoop 28A forming a part of the weir may be added to bow 52 of a tanker 53 which serves as an accumulator.

Figures 15, 16:
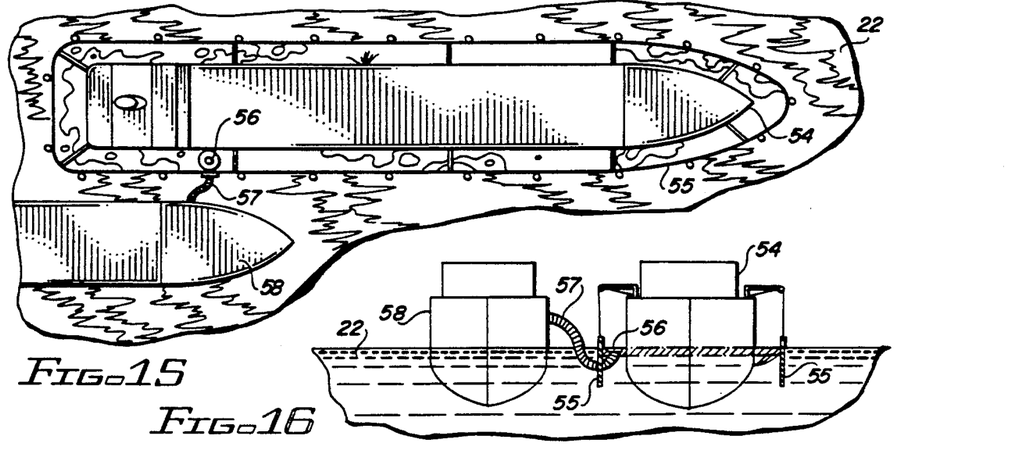
FIG. 15 is a plan view of an oil leaking tanker employing a confinement wall around the tanker and a weir within the wall for collecting the spilled oil for pumping into a storage tanker.
FIG. 16 is an end view of the leaking tanker, weir and storage tanker shown in FIG. 15.

FIGS. 15 and 16 disclose a leaking tanker 54 that has a curtain 55 vertically suspended from the tanker therearound and spacedly positioned from its hull. A floating weir 56 is arranged between the hull of the tanker and the curtain. This weir functions in the same manner as heretofore discussed for receiving the oil slick therethrough. The weir is connected through a pipe 57 to a storage tanker 58.

When accumulator 21 is full of oil it may be released from craft 10 and towed to shore for emptying. On shore, the rear door attachment 59, shown in FIG. 8, is rotatably moveable relative to frame 60 forming a part of accumulator 21. This door is opened to drain the accumulator. If the opposite end of the accumulator is elevated, oil will flow out of the accumulator with a sliding conveyor like movement of the baffles in the accumulator aiding in the draining action.

FIG. 17 diagrammatically illustrates a scaffold 61 having legs 62 for sitting on the ocean bottom 63 in shallow water. The scaffold is provided with a moveable deck 64 for positioning above the surface of the water. A rigid line 65 interconnects accumulator 21 with a floating rotatably mounted weir 66. The weir is connected with a boom 67 for encircling in a controlled manner a portion of an oil spill. This boom may be controlled by one or more tugs as heretofore explained. Oil and water drained from the accumulator may be retrieved from the accumulator by one or more discharge line means 68 serviced by a suitable motor 69.

It should be noted that the ocean bottom supported accumulator may be wheel mounted and backed into a shallow opening, ditch, trough or tunnel in the ocean bottom, then filled with surface oil and debris and then retrieved by a truck in the same manner as light trailer mounted water craft are launched and retrieved today in the sporting industry and still fall within the scope of this invention.

Although but a few embodiments of the present invention have been illustrated and described, it will be apparent to those skilled in the art that various changes and modifications may be made without departing from the spirit of the invention or from the scope of the appended claims.

What is claimed is:

1. An accumulator comprising:
    an elongated hull,
    an inlet at one end thereof and an outlet at the other end thereof,
    said inlet being positioned at the top of said hull,
    said outlet being positioned at the bottom of said hull,
    said inlet comprising a sluice gate,
    a cover fitting over and sealing said hull,
    said cover comprising float means for controlling the vertical position and buoyancy of said accumulator,
    said float means comprising three parallelly arranged flotation shells extending longitudinally of said cover, and
    control means for filling and expelling sea water from said float means for controlling the buoyancy of the accumulator.

2. The accumulator set forth in claim 1 wherein:
    said flotation shells are expandable.

3. The accumulator set forth in claim 1 wherein:
    said hull is provided internally thereof with a plurality of spaced baffles extending laterally of its longitudinal axis.

* * * * *